United States Patent [19]
Yang

[11] Patent Number: 5,590,974
[45] Date of Patent: Jan. 7, 1997

[54] ASSEMBLING CONNECTOR STRUCTURE

[76] Inventor: Tian-Show Yang, No. 173, Pu Tzu Keng, Ping Lin Tsun, Tai Ping Hsiang, Taichung Hsien, Taiwan

[21] Appl. No.: 452,493

[22] Filed: May 30, 1995

[51] Int. Cl.⁶ .................................................. F16B 21/08
[52] U.S. Cl. ........................ 403/327; 403/171; 403/329
[58] Field of Search ..................................... 403/326, 327, 403/329, 169, 171, 176; 211/186, 192, 134

[56] References Cited

U.S. PATENT DOCUMENTS

| | | | |
|---|---|---|---|
| 1,844,410 | 2/1932 | Schalk | 403/327 |
| 3,791,096 | 2/1974 | Epperlein | 403/327 X |
| 4,247,216 | 1/1981 | Pansini | 403/329 X |
| 4,630,550 | 12/1986 | Weitzman | 403/171 X |

FOREIGN PATENT DOCUMENTS 4344 of 1896 United Kingdom .................. 403/329

*Primary Examiner*—Anthony Knight
*Attorney, Agent, or Firm*—Browdy and Neimark

[57] ABSTRACT

An assembling connector structure including a multidirection connector having multiple square hollow insertion columns, multiple square connecting tubes and multiple substantially U-shaped leaf springs. Each face of each insertion column is formed with two through holes and each end of each connecting tube is formed with two through holes. Each leaf spring is disposed with a long and a short engaging boss. The long boss has upper and lower engaging recesses. When assembled, the leaf spring is first inserted into and engaged with the insertion column. Then the connecting tube is fitted around the insertion column with the through holes of the connecting tube aligned with the through holes of the insertion column, so that the bosses of the leaf spring pass through the aligned through holes to bound outside the connecting tube to assemble the connector structure into a solid frame assembly having multiple square frames. Several frame boards are horizontally positioned in the square frames of the frame assembly for placing articles on the frame boards. The long and short bosses of the leaf spring are led via the through holes formed on four corners of the frame walls of the frame board with the upper and lower engaging recesses engaged with the through holes on the frame walls so that the frame boards are securely fixed on the square frames.

1 Claim, 4 Drawing Sheets

ASSEMBLING CONNECTOR STRUCTURE

BACKGROUND OF THE INVENTION

The present invention relates to an assembling connector structure including a multidirection connector having multiple square hollow insertion columns, multiple square connecting tubes and multiple substantially U-shaped leaf springs. Each leaf spring is disposed with a long engaging boss and a short engaging boss. The long boss is formed with an upper and lower engaging recesses. When assembled, the leaf spring is first inserted into and engaged with the insertion column. Then the connecting tube is fitted around the insertion column with the through holes of the connecting tube aligned with the through holes of the insertion column, so that the bosses of the leaf spring pass through the aligned through holes to bound outside the connecting tube to assemble the connector structure into a solid frame assembly having multiple square frames. Several frame boards having rectangular frame walls and flanges on four sides are horizontally positioned in the square frames of the frame assembly for placing articles on the frame boards. The long and short bosses of the leaf spring extend through holes formed on four corners of the frame walls of the frame board with the upper and lower engaging recesses engaged therewith so that the frame boards are securely fixed on the square frames and prevented from detaching and dropping therefrom.

FIG. 1 shows a conventional assembling connector structure which includes a multidirection connector 10 having multiple square hollow insertion columns 11, multiple square connecting tubes 20 and multiple substantially U-shaped leaf springs 30. Each face of each insertion column 11 is formed with two through holes 12 and each end of each connecting tube 20 is formed with two through holes 21. Each leaf spring 30 is disposed with two engaging bosses 31 on a surface thereof. When assembled, the leaf spring 30 is first inserted into and engaged with the insertion column 11. Then the connecting tube is fitted around the insertion column 11 with the through holes 21 of the connecting tube 20 aligned with the through holes 12 of the insertion column 11, whereby the bosses 31, 32 of the leaf spring 30 can pass through the aligned through holes 12, 21 to bound outside the connecting tube 20. Accordingly, the connector structure can be continuously assembled into a solid frame assembly.

In addition, several frame boards 40 having rectangular frame walls 41 and flanges 42 on four sides can be horizontally positioned in the square frames of the frame assembly with the engaging bosses 31 of the leaf spring 30 extending through and engaging with through holes 43 on four corners of the frame walls 41 as shown in FIG. 2 for placing articles on the frame boards 40.

According to the above arrangements, the frame boards 40 are supported on the square frames only by the engaging bosses 31 of the leaf springs 30 and not firmly fixed. Therefore, the frame boards 40 are apt to detach and drop from the square frames.

Therefore, it is necessary to provide an improved assembling connector structure to solve the above problem.

SUMMARY OF THE INVENTION

It is therefore a primary object of the present invention to provide an assembling connector structure in which the leaf spring has a long engaging boss and a short engaging boss on a surface thereof. The long engaging boss is formed with an upper and a lower engaging recesses at a free end thereof, whereby after the frame board is positioned in the square frame of the frame assembly, the long and short engaging bosses of the leaf spring extend through the through holes on four corners of the frame wall of the frame board with the engaging recesses securely engaged with the through holes of the frame walls so that the frame board is firmly fixed on the square frame and prevented from detaching and dropping therefrom.

The present invention can be best understood through the following description and accompanying drawings, wherein:

DETAILED DESCRIPTION OF THE PREFERRED EMBODIMENT

Figure 1:
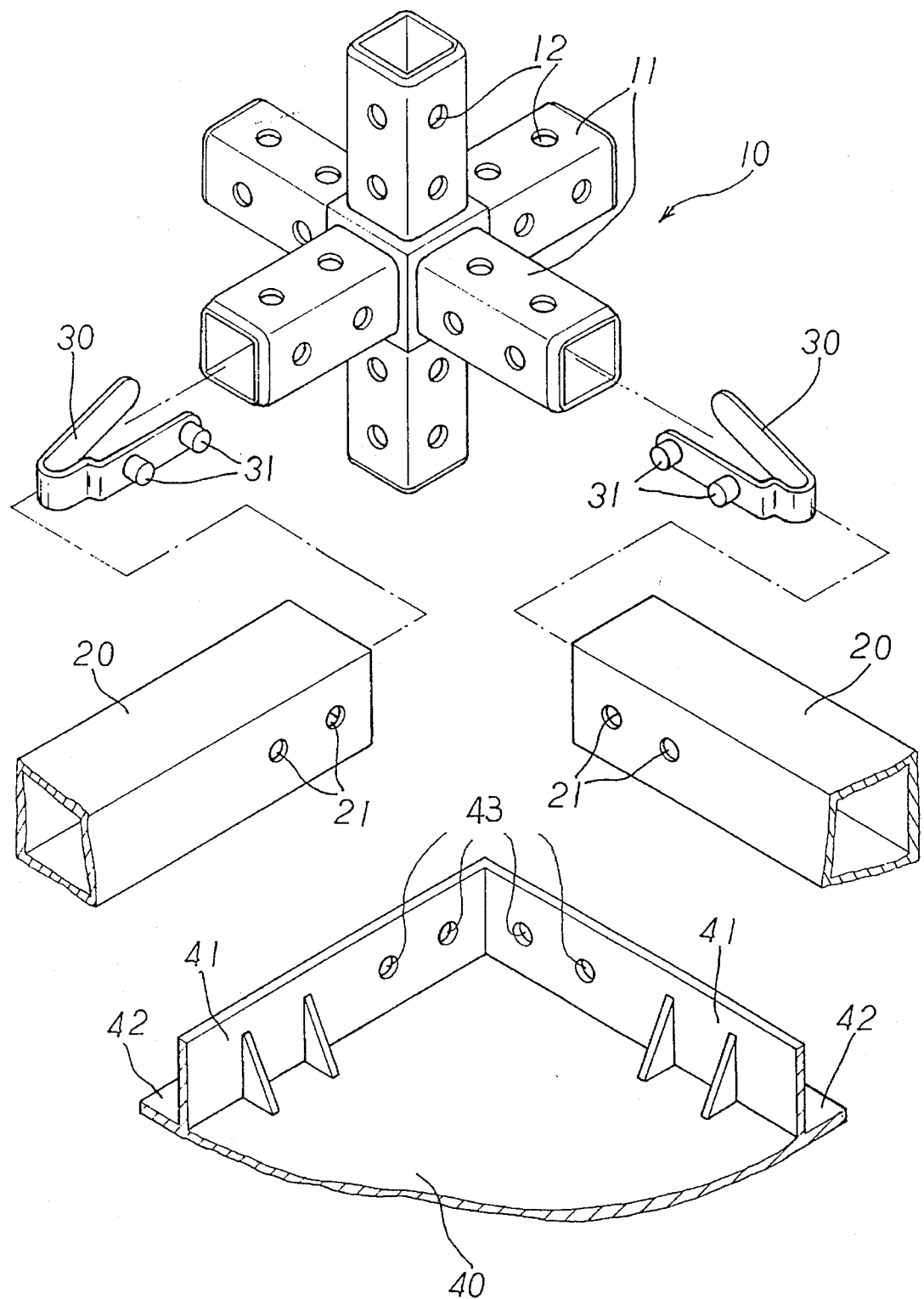
FIG. 1 is a perspective exploded view of a conventional assembling connector structure.
Figure 2:
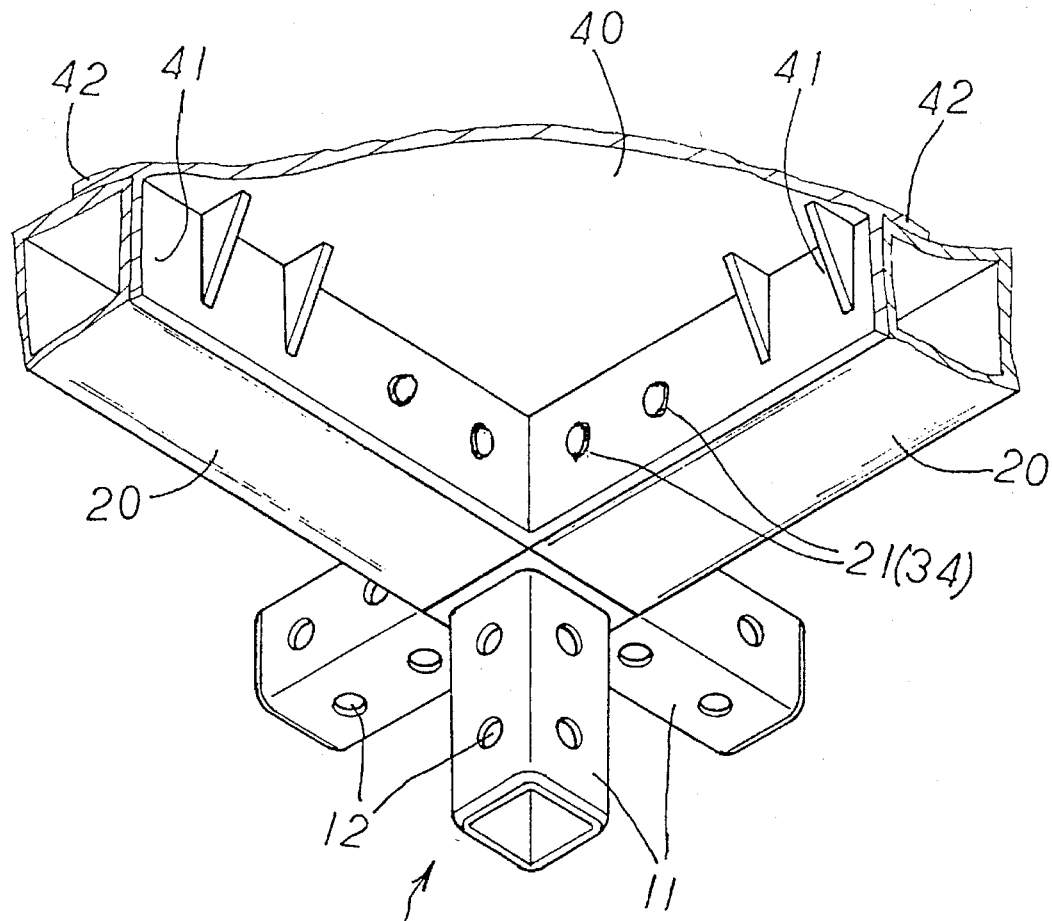
FIG. 2 is a bottom perspective assembled view of the conventional assembling connector structure.
Figure 4:
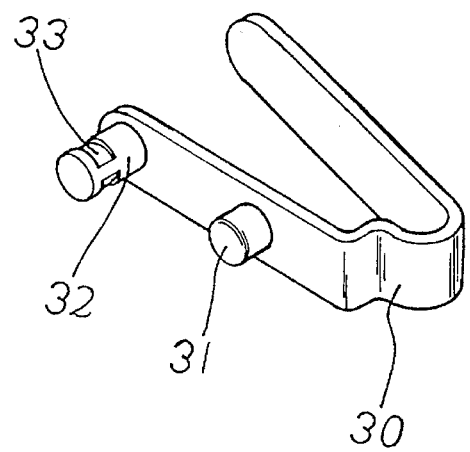
FIG. 4 is an enlarged view of the leaf spring of the present invention.
Figure 3:
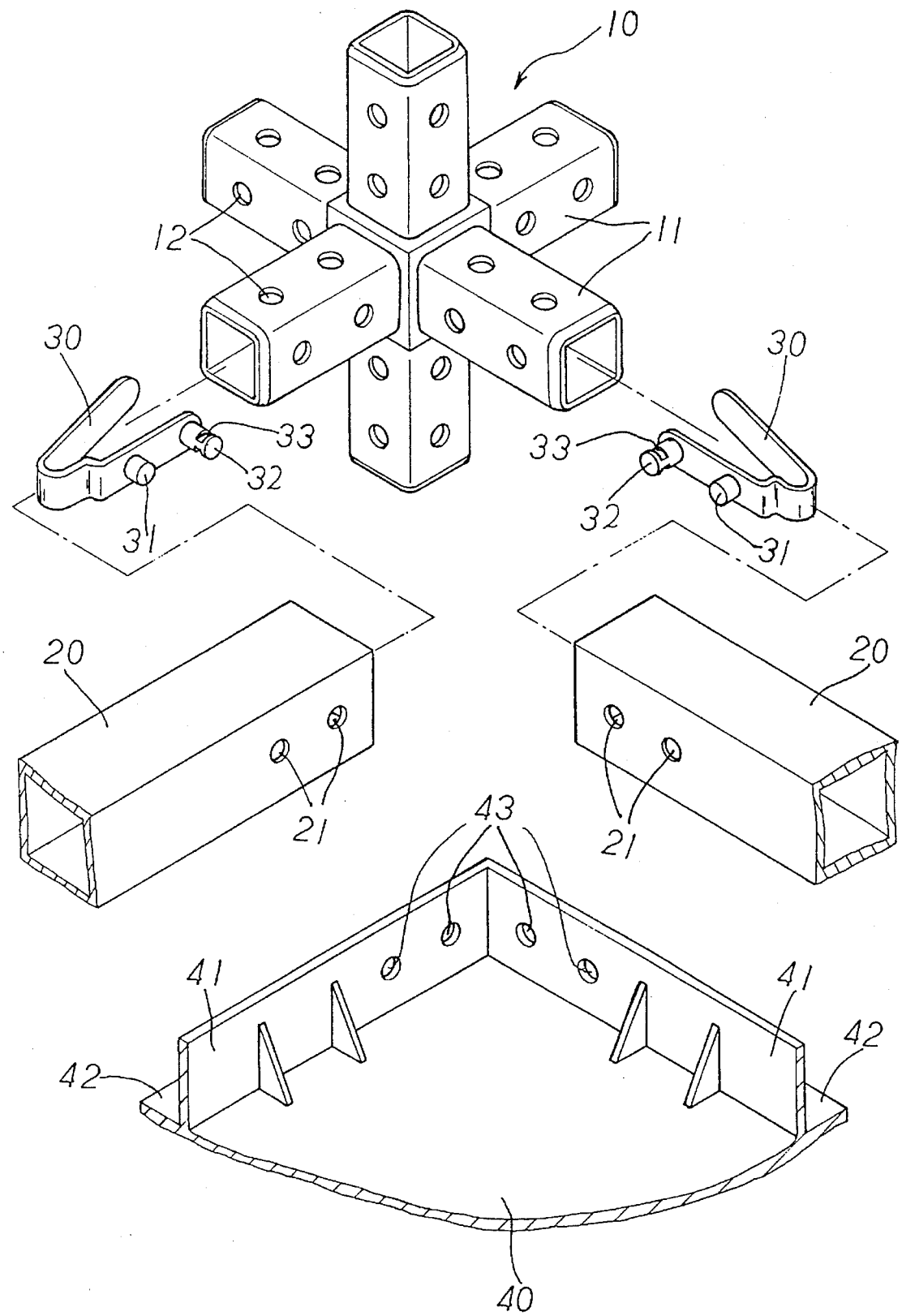
FIG. 3 is a perspective exploded view of the present invention.
Figure 5:
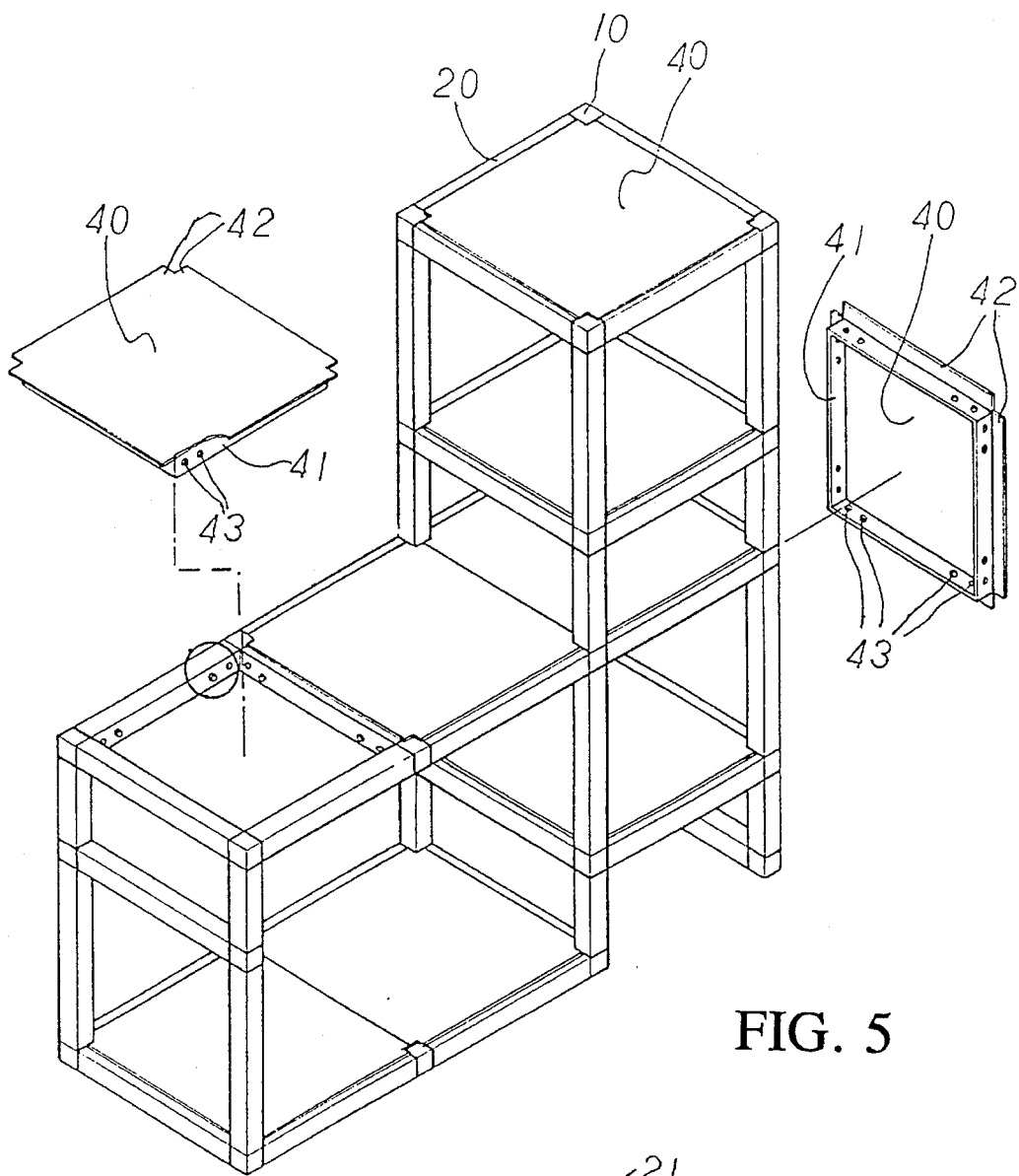
FIG. 5 is a perspective view of the frame assembly formed by the connector structure of the present invention.

Please refer to FIG. 3. The connector structure of the present invention includes a multidirection connector 10 having multiple square hollow insertion columns 11, multiple square connecting tubes 20 and multiple substantially U-shaped leaf springs 30. Each face of each insertion column 11 is formed with two through holes 12 and each end of each connecting tube 20 is formed with two through holes 21. Each leaf spring 30 is disposed with a long cylindrical engaging boss 32 and a short cylindrical engaging boss 31 on a surface thereof, wherein a free end of the long engaging boss 32 is formed with an upper and lower engaging recesses 33. Recesses 33 are symmetrically spaced apart on cylindrical engaging boss 32 as shown in FIG. 3–5. When assembled, the leaf spring 30 is first inserted into and engaged with the insertion column 11. Then the connecting tube is fitted around the insertion column 11 with the through holes 21 of the connecting tube 20 aligned with the through holes 12 of the insertion column 11, whereby the bosses 31, 32 of the leaf spring 30 can pass by spring action through the aligned through holes 12, 21 to bound outside the connecting tube 20. Accordingly, the connector structure can be continuously assembled into a solid frame assembly as shown in FIG. 5. In addition, several frame boards 40 having rectangular frame walls 41 and flanges 42 on four sides can be horizontally positioned in the square frames of the frame assembly for placing articles on the frame boards 40.

Figure 5A:
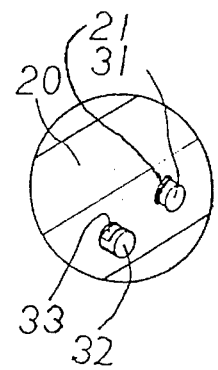
FIG. 5A is an enlarged view of the encircled portion of FIG. 5.

As shown in FIGS. 3 and 5A, the long and short bosses 32, 31 of the leaf spring 30 can further pass through and engage with through holes 43 on four corners of the frame walls 41 with the engaging recesses 33 of the long engaging boss 32 securely latched with the through holes 43 of the frame walls 41. Therefore, the frame board 40 is prevented from dropping down from the square frame of the frame assembly.

The above embodiment is only an example of the present invention and the scope of the present invention should not be limited to the example. Any modification or variation derived from the example should fall within the scope of the present invention.

What is claimed is:

1. An assembling connector structure comprising a multidirection connector having multiple square hollow insertion columns, multiple square connecting tubes and multiple substantially U-shaped leaf springs, each face of each insertion column being formed with two through holes and each end of each connecting tube being formed with two through holes, each leaf spring of said U-shaped leaf springs being disposed with an outward engaging boss and an inward engaging boss on a surface thereof, said outward engaging boss and said inward engaging boss being substantially cylindrical, whereby when assembled, the leaf spring is first inserted into and engaged with the insertion column and then the connecting tube is fitted around the insertion column with the through holes of the connecting tube aligned with the through holes of the insertion column, so that each said boss on the leaf spring passes by spring action through the aligned through holes to bound outside the connecting tube to assemble the connector structure into a solid frame assembly having multiple square frames, several frame boards having rectangular frame walls and flanges on four sides being horizontally positioned in the square frames of the frame assembly for placing articles on the frame boards, said connector structure being characterized in that said outward boss of the leaf spring is longer than said inward boss, said outward boss being formed with an upper and a lower engaging recess symmetrically spaced apart on said outward boss, each said engaging recess passing by spring action into and engaging with through holes formed on four corners of the frame walls of the frame board so as to securely fix the frame board on the square frame and prevent the frame board from detaching and dropping therefrom.

* * * * *